United States Patent [19]

Mittelhäuser

[11] Patent Number: 4,514,060
[45] Date of Patent: Apr. 30, 1985

[54] EXTERNAL REAR VIEW MIRROR FOR MOTOR VEHICLES WHICH FOLDS

[76] Inventor: Bernhard Mittelhäuser, No. 57, 3002 Wedemark 2, Fed. Rep. of Germany

[21] Appl. No.: 354,167

[22] Filed: Mar. 3, 1982

[30] Foreign Application Priority Data

Mar. 3, 1981 [DE] Fed. Rep. of Germany ....... 3107988

[51] Int. Cl.³ .............................................. B60R 1/06
[52] U.S. Cl. ..................................... 350/632; 248/900
[58] Field of Search ............... 350/288, 307, 589, 590; 75/501 M; 248/900

[56] References Cited

U.S. PATENT DOCUMENTS

| 4,247,173 | 1/1981 | Vitaloni | 350/307 |
| 4,279,473 | 7/1981 | Yamana | 350/307 |
| 4,380,370 | 4/1983 | Mittelhauser | 248/900 X |

FOREIGN PATENT DOCUMENTS 2432707 1/1976 Fed. Rep. of Germany ...... 248/900

Primary Examiner—John K. Corbin
Assistant Examiner—David Lewis
Attorney, Agent, or Firm—Becker & Becker, Inc.

[57] ABSTRACT

An external rear view mirror for motor vehicles, with a shell-shaped housing for receiving a mirror body which is preferably adjustable from the vehicle interior. The freely projecting part of the mirror housing is pivotably mounted on the housing base, and the gap between the freely projecting part on the one hand, and the housing base on the other hand, is adapted to be bridged by a flat seal. One edge of the seal is securely clamped, while the other edge engages releasably in, and is capable of being lifted from, a groove.

11 Claims, 3 Drawing Figures

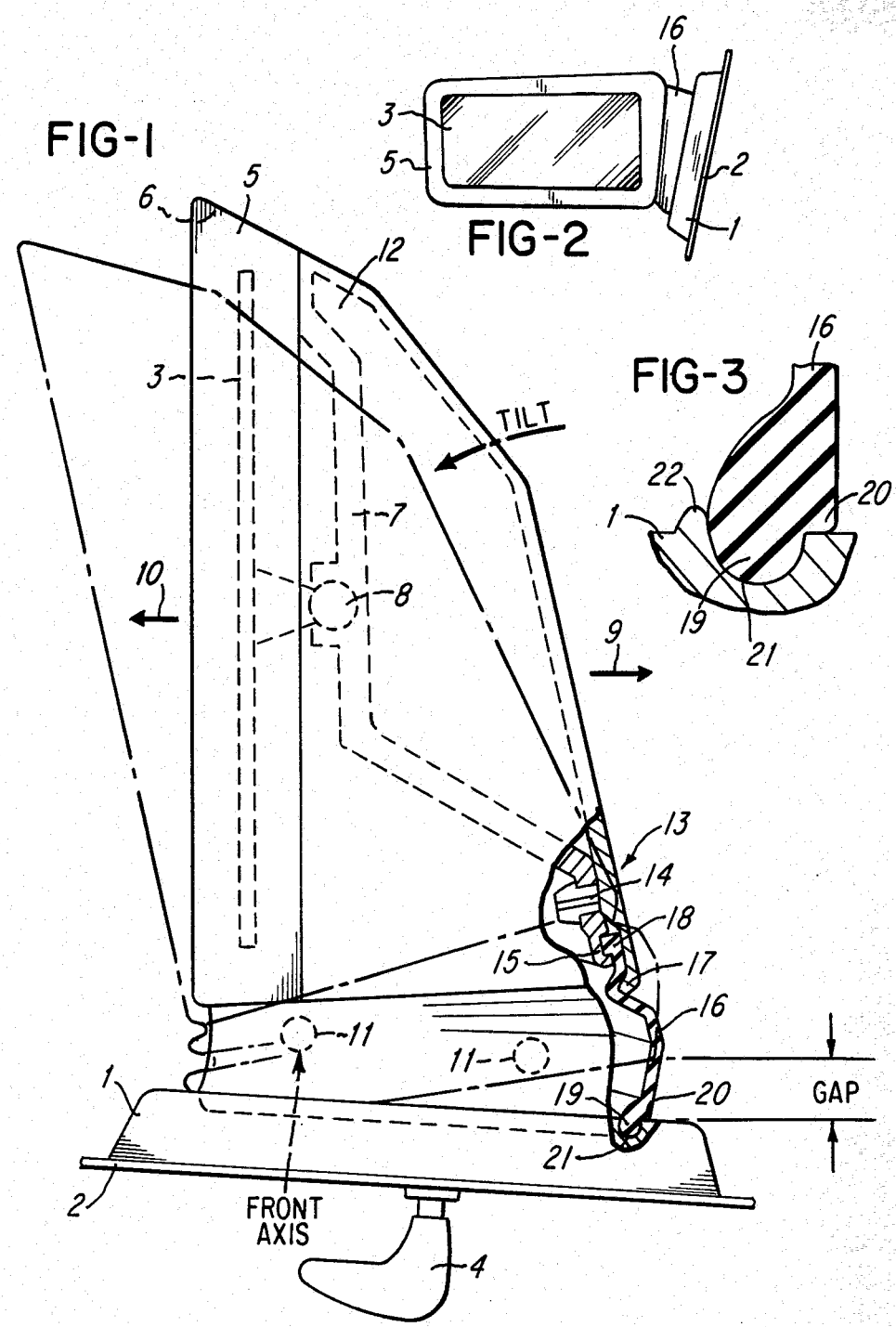

EXTERNAL REAR VIEW MIRROR FOR MOTOR VEHICLES WHICH FOLDS

The present invention relates to an external rear view mirror for motor vehicles, and has a shell-shaped housing for receiving a mirror body, which is preferably adjustable from the interior of the vehicle; the freely projecting part of the mirror housing is pivotably mounted on the base of the housing, and the gap between the freely projecting part on the one hand, and the housing base on the other hand, is adapted to be bridged or spanned by a flat seal.

A difficulty arises when sealing the gap between the tiltable part of the housing and the mounting base; such difficulty consists in that accordion-shaped seals must be made very complicated and extensible or flexible if these seals are to be effective not only in the position of use of the mirror, but also when the mirror is tilted.

The present invention proceeds from the recognition that the mentioned seal, in the tilted condition of the mirror, only has a minor importance, and generally has no importance at all in such a situation.

It is an object of the present invention to provide a seal which structurally is comparatively simple, yet is sufficient for mirror operation, with such seal completely fulfilling its sealing function in the operating position of the mirror.

This object, and other objects and advantages of the present invention, will appear more clearly from the following specification in connection with the accompanying drawing, in which:

FIG. 1 is a partially sectioned plan view of one embodiment of the inventive external rear view mirror located in an operating position;

FIG. 2 shows the mirror of FIG. 1 in a fragmentary view as seen in the direction toward the mirror body; and FIG. 3 is an enlarged fragmentary sectional view of a detailed portion of FIG. 1.

The rear view mirror of the present invention is characterized primarily in that one edge of the seal is securely clamped, while the other edge engages releasably in, and is capable of being lifted from, a groove.

Accordingly, the apron-like seal is fastened at only one edge; the other edge of the seal engages in a groove to achieve a positive connection. However, this connection is such that on the one hand, the seal retains its position even when experiencing an air flow during movement of the vehicle and, on the other hand, the seal can be readily lifted from the groove for tilting the mirror; the edge of the seal is again introduced into the groove when the mirror is tilted into the position of use.

According to specific features of the present invention, the groove may have its greatest width in the region of the opening thereof (the surface of the housing base), and moreover, the groove need not be undercut. The groove may have an approximately semicircular cross section.

The seal may be essentially arcuate-shaped in cross section, with the curve being disposed counter to the direction of travel of the associated vehicle.

The groove may be located in the base of the housing.

The edge of the seal which faces the tiltable part of the housing may be clamped between a rear part of the housing which is remote from the mirror body, and a front part of the housing which surrounds the mirror body. The rear part may be fastened by an easily releasable snap connection. The edge of the seal may be thickened between the clamping parts, and may engage in a groove.

That part of the seal which engages in the groove may be thickened. A shoulder may be provided on the seal adjacent to this thickened portion, and is preferably outwardly directed on one side thereof; with this shoulder, the edge of the seal engages in the region of the groove edge. In the region of the groove edge which is located opposite to the shoulder, there may be provided a beadlike thickened portion adjoining the groove.

Referring now to the drawing in detail, a base 1 serves for fastening the mirror in position of use thereof; the base 1 is mounted on the vehicle body 2 or on a door of the vehicle. The adjustment of the mirror is effected from the inside via an adjustment lever 4.

The approximately dish- or shell-shaped housing of the mirror, for receiving the mirror body 3, has a front part 5 with a front rim or edge 6 which surrounds the opening of the housing. Ribs 7 of the front part 5 serve for mounting the different elements of the mirror which are necessary for pivoting the mirror body 3. The ball joint seat 8 is also arranged here. Furthermore, levers and pivot shafts 11 are located within the housing so that the mirror can be tilted either in the direction of travel 9, or counter to the direction of travel, as represented by arrow 10.

The rear, closed part 12 of the housing, which as four button-like projections 14 longitudinally undercut to attain a snap connection at 13, serves to cover the back of the previously mentioned parts, and to achieve a streamlined housing shape. The associated openings are located on the ribs 7 or the like, which are rigidly connected with the front housing part 5. The part 12 can be removed and reinstalled via this snap connection.

A groove 15 is located at the lower edge of the rib 7 for holding the upper edge of an approximately arcuate, thin-walled seal 16 of rubber or the like, which bridges and seals the gap between the tiltable part of the housing (parts 5,12) on the one hand, and the base 1 on the other hand.

The seal 16, in the vicinity of its upper edge, rests against an inwardly directed angled-off portion 17 of the part 12, while its thickened edge portion or bead 18 rests in the groove 15. A clamping connection produced in this manner is attained by installing and latching the part 12.

A bead-like thickened portion 19 extends along the seal 16 at the lower edge thereof, i.e. at that edge of the seal 16 which faces the base 1. An outwardly extending shoulder 20 projects from this bead-like thickened portion 19 and rests on the surface of the base 1, while the thickened portion 19, with a certain compressive stress lies fully in the groove 21 of the base 1 (see FIG. 3).

The groove 21 is widest in the surface of the base 1, i.e., is not undercut, in such a manner that the thickened portion 19 can readily enter the groove 21 when the mirror is tilted into the operative position of FIG. 1. Moreover, the thickened portion 19 can be lifted from the groove 21 without hindrance when a tilting movement must occur in the direction of arrow 10. A withdrawal of the thickened portion 19 out of the groove 21 does not take place during tilting movement in the direction of arrow 9; a corresponding deformation of the seal 16 occurs, but even if the thickened portion 19 should leave its groove 21 under these conditions, the thickened portion 19 again assumes the position according to FIG. 1 because of its sufficient inherent rigidity.

As shown in FIG. 3, a bead-like thickened portion 22 can be provided in the vicinity of the edge of the groove 21 to facilitate entry of the thickened portion 19 into the groove 21.

The fact that the curve or arc of the seal 16 extends in the direction of arrow 9 furthermore has the great advantage that under the influence of air flow, e.g. when the vehicle is being driven, the compression of the thickened portion 19 in the groove 21 becomes greater.

The present invention is, of course, in no way restricted to the specific disclosure of the specification and drawing, but also encompasses any modifications within the scope of the appended claims.

What I claim is:

1. An external rear view mirror for motor vehicles, comprising:
   a base adapted to be fastened to a vehicle;
   a housing for receiving a mirror body, said housing being pivotably mounted to said base in such a way that a gap formation exists during tilting between said base and said housing when an impact has been exerted upon said housing in a particular direction including a tilting occurrence during an accident; and
   a relatively flat seal which is adapted to span said gap formation during tilting between said base and said housing, said seal having a first edge directed toward said base, and a second edge directed toward said housing, with one of said base and said housing being provided with at least one groove in the vicinity of said seal; with one of said first and second edges of said seal being securely fixed at only one of said edges relative to one of said base and said housing, and with the other of said first and second edges of said seal being readily releasably engageable with a positive connection in, and also being readily capable of being lifted away from, said at least one groove whereby the mirror folds into different positions dependent upon occurrence of tilting between said base and said housing to make sure that a sealing effect exists even though a gap formation occurs when a tilting has arisen.

2. A rear view mirror according to claim 1, in which said at least one groove is open toward said seal, has its greatest width at said opening, and it not undercut.

3. A rear view mirror according to claim 2, in which said at least one groove has an approximately semi-circular cross section.

4. A rear view mirror according to claim 1, in which said seal has an essentially arcuate cross section, with the curve being disposed counter to the direction of forward travel of the associated vehicle.

5. A rear view mirror according to claim 1, in which said at least one groove is provided in said base.

6. A rear view mirror according to claim 1, in which said housing includes a front part which surrounds said mirror body, and a rear part which is remote from said mirror body, said second edge of said seal being clamped between said front and rear parts of said housing.

7. A rear view mirror according to claim 6, in which said rear part of said housing is provided with a snap connection for releasable connection to said front part of said housing.

8. A rear view mirror according to claim 6, in which said front part of said housing is provided with a second groove in the vicinity of said second edge of said seal, with said second edge of said seal being thickened for insertion into said second groove.

9. A rear view mirror according to claim 1, in which that edge of said seal which is engageable in said at least one groove is provided with a thickened portion.

10. A rear view mirror according to claim 9, in which said seal is provided with a shoulder adjacent to said thickened portion for engagement with that mirror part which is provided with said at least one groove, said shoulder engaging the associated mirror part in the vicinity of the edge of said one groove.

11. A rear view mirror according to claim 10, in which that mirror part which is provided with said at least one groove is provided with a bead-like thickened portion adjoining said one groove and on that edge of said one groove opposite that portion of the associated mirror part which is engaged by said shoulder.

* * * * *